July 15, 1969    P. HUET    3,455,165

PRESSURE SENSITIVE DEVICES

Filed Dec. 20, 1966    2 Sheets-Sheet 1

INVENTOR:
Pierre Huet
BY Spencer & Kaye
ATTORNEYS

July 15, 1969        P. HUET        3,455,165

PRESSURE SENSITIVE DEVICES

Filed Dec. 20, 1966        2 Sheets-Sheet 2

INVENTOR:
Pierre Huet
BY *Spencer & Kaye*
ATTORNEYS

United States Patent Office 3,455,165
Patented July 15, 1969

3,455,165
PRESSURE SENSITIVE DEVICES
Pierre Huet, 51 Rue Thiers 76, Bolbec, France
Filed Dec. 20, 1966, Ser. No. 603,269
Claims priority, application France, Dec. 22, 1965,
7,122; Sept. 22, 1966, 7,156
Int. Cl. G01l 9/04
U.S. Cl. 73—398    21 Claims

ABSTRACT OF THE DISCLOSURE

Pressures, pressure variations or vibrations are transformed into electrical signals by means of devices having on a diaphragm thin conducting layers arranged so as to use the transverse effect of their resistance variations under radial deformations. The performances (sensitivity, linearity, lightness, etc.) are surprisingly superior to those obtainable with known devices.

---

This invention relates to pressure sensitive electro-mechanical devices incorporating a deformable diaphragm on which is disposed a thin conducting layer.

It is well known that the electrical resistance of such a layer varies proportionally to an extension imposed thereon. If one applies a relative extension $\epsilon_1$ parallel to the direction of the measuring current and a relative extension $\epsilon_t$ perpendicular to this direction the variation relative to the resistance is represented as follows:

$$\frac{\Delta R}{R} = k_1 \epsilon_1 + k_t \epsilon_t$$

where: $k_1$ is the coefficient characterizing the longitudinal effect;
$k_t$ is a coefficient characterizing the transverse effect.

This is a general phenomenon valid for all conductors. When the latter are in the form of wires or thin ribbons, $k_1$ is about 2 and $k_t$ practically negligible as is the case for classic strain gauges.

By contrast, when the conductor is deposited, by thermal evaporation in a vacuum, for example, in the from of a thin film of about 0.1 micron thickness, $k_1$ and $k_t$ attain high values. For a thin film of bismuth for example of 0.1 micron thickness deposited on mica or cellulose acetate, I found that $k_1$ is about 25 and $k_t$ about 45.

An object of the present invention is to provide a device using the aforesaid transverse effect of thin conducting layers to transform a pressure, which may be a pressure variation or vibration, into an electric signal, such a device being more sensitive than devices known hitherto and having a better fidelity and linearity as well as being much easier to make and use.

It is a further object of the invention to provide a transducer for detecting, measuring and regulating pressures, differences of pressure, levels, altitudes, flowrates, pressure variations, subsonic, sonic or ultra-sonic vibrations, deformations and displacements.

Another object of the invention is to provide a transducer for static or dynamic pressure measurements.

Yet another object of the invention is to provide a manometer capsule or transducer of very small dimensions enabling quasi-punctural pressures to be explored in fluid media.

A further object of the invention is to provide a device for measuring either the rate of flow of fluid, or the speed of displacement of a body in a fluid.

A still further object of the invention is to make use of the said transverse effect in devices employing diaphragms in the form of very thin membranes.

A still other object of the invention is to provide pressure sensitive transducers the behaviour of which is not affected by nuclear or neutronic radiations.

Other objects and advantages of the invention will appear from the following description, by way of example, with reference to the drawings of several embodiments thereof. In the drawings.

In its broadest aspect, the invention provides a pressure-sensitive device for converting pressure variations into electrical vibrations, said device comprising a flexible diaphragm having thereon at least one thin conducting layer, diaphragm supporting means defining a circular portion of said diaphragm and firmly gripping said diaphragm around the periphery of said portion, and, within said supporting means, at least two means for connecting said layer into an external circuit, said conducting layer being disposed between said connecting means and extending along at least a part of the periphery of at least one face of said diaphragm portion.

Figure 1:
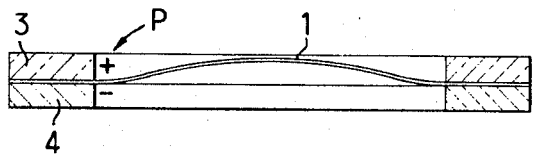
FIG. 1 shows simply the shape assumed by a plate gripped around its periphery and deformed by pressure applied to its central region.

When a flat disc, rigidly gripped at its periphery is deformed by a difference of pressure applied between its faces in the central region of the disc, the deformation will have the form shown in FIG. 1, provided that the displacement of the central region remains less than the thickness of the disc and that the Young's modulus of material constituting the disc is sufficiently large for the latter to act as a plate. Under these conditions, the radial deformations reach their highest values adjacent to the periphery P of the disc and produce the tension stresses or elongation on one face (−) and compression on the other face (+). These stresses being proportional to the pressure applied, the resistance of thin conducting layers disposed in the peripheral zone of the disc will undergo linear variations. Such variations will be in opposite senses on the two faces of the disc, thus providing the extremely useful possibility of arranging the layers in bridge circuits.

Figure 9:
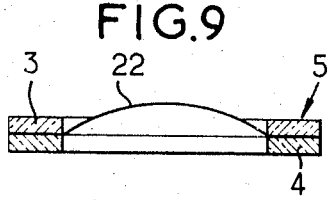
FIG. 9 shows the deformation under pressure of a thin flat membrane.
Figure 10:
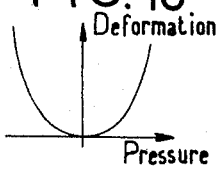
FIG. 10 is a curve of the deformation of the membrane of FIGURE 9 as a function of the pressure difference applied thereto.

By contrast, discs made from material having very low Young's moduli such as Mylar for example, and having a small thickness (less than $20\mu$ for Mylar) act in a different manner. When peripherally gripped, they cease to act as a plate and the deformation under pressure, as aforesaid, assumes the form of a sphere as shown in FIG. 9. I have studied the deformations with the aid of the resistance variations of thin bismuth film deposited on Mylar membrane of $6\mu$ thickness and found that, as a function of the difference in pressure applied, the deformations are represented by a curve having the shape of that shown in FIG. 10 which is approximately a parabola.

It is clear that a thin membrane such as that described above and carrying a thin conducting layer does not produce a linear signal in response to pressure variations, and moreover the sensitivity of the device in the region of zero pressure will be very weak. There can however be produced a good sensitivity and a good enough linearity for weak variations of pressure difference about a given pressure difference. However, in such membranes the stresses occur in the same sense on both faces, which precludes the advantages of the opposed variations obtained when using the aforesaid discs.

According to an aspect of the invention it is nevertheless possible to retain these advantages even with very thin membranes by providing a device of the aforesaid kind in which said diaphragm is a membrane having a circular portion comprising an inner part and a peripheral annular part, said parts meeting in an arris and said conducting layer being disposed on said annular part.

The diaphragm may be made for example from mica, quartz, glass, cellulose acetate, polyamides, ethylenglycol terephthalate (T.M. Mylar), polyamides (T.M. Kapton), etc.

According to the embodiment shown in FIGS. 2 to 5, the device of the invention has four conducting layers of bismuth designated respectively as $b_1$, $b_2$, $b_3$, $b_4$ having a thickness of the order of 0.1 micron each deposited in an arc of a circle covering approximately 180°. Connecting layers $c$ of nickel having a thickness of about $1\mu$ are connected respectively to eyelets A, B, C, D which are attached to the diaphragm and to the supporting means in the manner to be described hereinafter. The two faces of the diaphragm can be covered with a protecting varnish or for example with silica monoxide deposited by evaporation in a vacuum.

Figure 5:
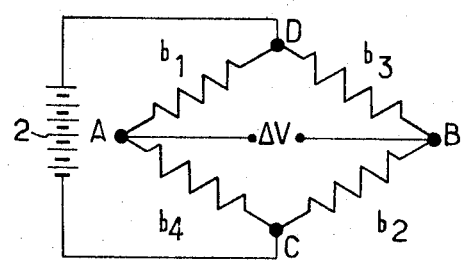
FIG. 5 is a diagram of the electrical equivalent of the device of FIGS. 2 and 3.

The eyelets A, B, C, D connect the thin layers $b_1$, $b_2$, $b_3$, $b_4$ so that they form a bridge circuit, the electrical diagram of which is shown in FIG. 5. Thus, when the diaphragm is deformed at its central region the resistances of the pairs of layers disposed respectively on either side of the diaphragm vary in opposite senses so that when the circuit of FIG. 5 is fed by a voltage V between the points C and D, there will appear between the points A and B a potential difference $\Delta V$ proportional to the variation $\Delta R$ of resistance of the layers and such that $$\Delta V/V = \Delta R/R$$

It would be equally possible to feed the circuit at A and B and measure the voltage imbalance between C and D because, owing to the identical nature of the conducting layers and the manner of their arrangement on the diaphragm 1 the bridge of FIG. 5 is substantially perfectly symmetrical.

Figure 2:
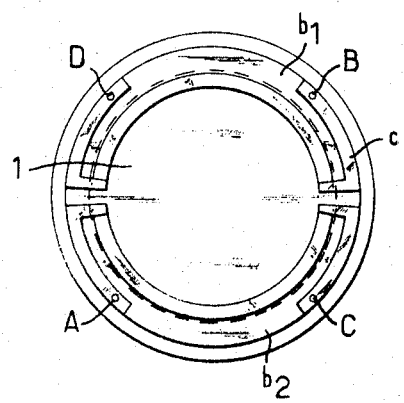
FIGS. 2 and 3 show respectively each side of a diaphragm of a device of the invention showing the disposition thereon of four thin conducting layers and associated connecting layers.
Figure 3:
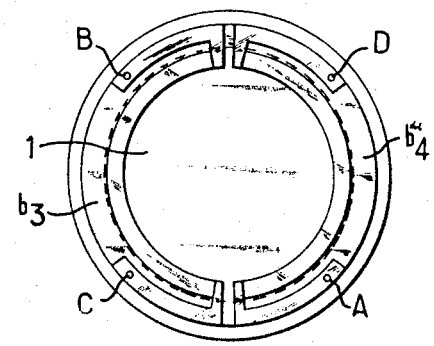
Figure 4:
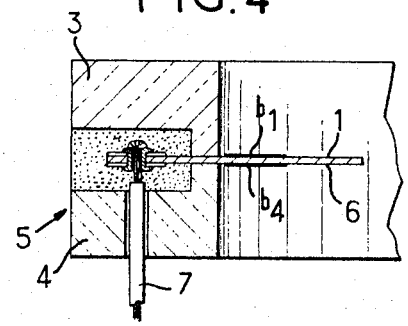
FIG. 4 is a part sectional view of a device of the invention showing the external connection thereto within the supporting means.

FIG. 4 shows a portion of the diaphragm 1 of FIGS. 2 and 3 gripped between two opposing portions 3 and 4 of a supporting means shown generally at 5, the supporting means delimiting a circular area 6 of the diaphragm. In this embodiment, the eyelets previously referred to do not extend outside the supporting means but connecting wires, one of which is shown at 7, are connected to the eyelets by soldering for example within the supporting means and pass through the latter so as to form exterior connections. The two portions 3 and 4 of the supporting means may be, for example, plastic rings assembled as shown in FIG. 4 and secured together by suitable means such as Araldite or other glue. Any other suitable means may of course be applied for securing the portions 3 and 4 together. The diaphragm 1 is uniformly held before and after securing between the elements 3 and 4. It is also possible to form the supporting means as a single piece by injection moulding directly onto the periphery of the diaphragm.

The layers $b_1$, $b_2$, $b_3$, $b_4$ are disposed as indicated by the position of $b_1$ and $b_4$ in FIG. 4. They are at the periphery of the free circular diaphragm 1 in which position the radial stress is at a maximum and the tangential stress is zero. It is the radial stress acting as a transverse constraint which leads to a maximum variation of resistance of the layers $b_1$, $b_2$, $b_3$, $b_4$ for a given deformation. It is the peripheral disposition of the layers which provides a maximum sensitivity and moreover this arrangement allows a ratio of length to width of the layers to be provided sufficient to support a feed voltage of the order of 10 volts. The voltage imbalance appearing for a given deformation being proportional to the feed voltage, it is desirable that the latter should be at least of the order of 10 volts. For example, for a diaphragm of 20 mm. diameter having bismuth layers of $0.1\mu$ thickness and 2 mm. width the impedance of each layer, equal to the impedance between A and B or C and D is about 600 ohms and the voltage used without the least detectable heating is of the order of 10 volts.

Considering the width of the layers $b_1$, $b_2$, $b_3$, $b_4$ as negligible compared with the radius of the free part of the diaphragm, the imbalance voltage of the bridge is given by the equation:

$$\Delta v = \frac{3k_t \cdot V \cdot P(1-\mu^2)r^2}{4E \cdot e^2}$$

where:

$k_t$ is the transverse coefficient of the conducting layers, being about 45 for bismuth
V is the feed voltage of the bridge
P is the difference of pressure between the two faces of the diaphragm
$\mu$ is the Poisson coefficient of the material of the diaphragm
E is the Young's modulus of the diaphragm material
r is the radius of the free part of the diaphragm
e the thickness of the diaphragm.

For example, for the aforesaid bismuth layers deposited on a mica diaphragm of 0.01 mm. thickness and fed by a voltage of 10 volts, there is obtained a voltage imbalance $\Delta v$ of about 0.15 mv. for a difference of pressure of the order of 1 Pascal.

For static use of the device, the bridge of FIG. 5 is fed preferably by an alternating low frequency voltage, the imbalance voltage appearing being used after demodulation as in conventional extensometry with the aid of carrier frequency bridges.

For dynamic use the bridge is fed by direct voltage. The amplitude of the voltage imbalance obtained is proportional to the amplitude of the applied difference of pressure and its frequency is equal to that of the variation in the pressure or of the vibration being sensed.

It is interesting to observe that the voltage imbalance $\Delta v$ is proportional to the amplitude of the pressure applied to the diaphragm and not to the speed of variation of this pressure as is the case for inductive or capacitive measuring devices. This advantage enables the device of the invention to be used for sensing pressure variations or vibrations of very low frequency. Moreover, the practically negligible inertia of the thin conducting layers deposited on the diaphragm scarcely affects the vibrations of the latter and enables very thin diaphragms (of a few microns thickness) to be used and thus relatively high frequency vibrations to be measured. By using an appropriate diaphragm, correctly damped, it is possible to obtain linear responses from 0 Hertz up to 100 to 200 kHz.

It is clear that flexing of the diaphragm can be provoked by the pressure or the variation in pressure of a gas or any liquid as well as by the displacement or vibration of any device mechanically connected to the diaphragm.

Examples of such uses are microphones, manometers (absolute or differential), manometric capsules, barometers, altimeters, output meters, pressure gauges having short response times, underground pressure or vibration gauges, remote explosion detectors, pressure gauges establishing the characteristic curves of internal combustion engines, etc.

Several practical applications of the device of the invention will now be described.

Figure 6:
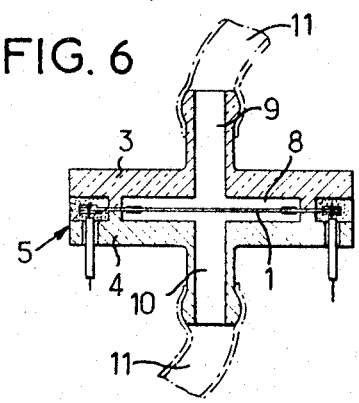
FIG. 6 shows the device of the invention in the form of a manometer.

FIG. 6 shows a differential or absolute manometer in which the supporting means 5 defines a chamber 8 around the diaphragm 1, access to the chamber being gained through tubular entrances 9 and 10 which may be connected by flexible connections 11 if desired to sources of pressure. A known pressure, for example atmospheric pressure, is applied to one face of the other diaphragm and a pressure to be measured applied to the face. Difference in pressure occurring between the two faces are expressed as a voltage imbalance at the output of the device. The embodiment of FIG. 6 can also operate as a pressure differential device and measure for example a fall in pressure or a flow rate in a conduit. The diameter of the tubes 9 and 10 as well as of the chamber defined by the supporting means 5 are chosen in such a way as to avoid introducing resonances in the frequency range of the applied pressure variations. Known damping systems be used in conjunction with such devices.

Figure 7:
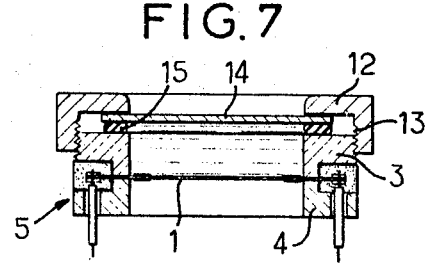
FIG. 7 shows a version of the device adapted to measure relatively high pressure.

The device of the invention can also be used for measuring high pressures if provided with the auxiliary means shown in FIG. 7. It will be appreciated that high pressures must be prevented from directly contacting the thin diaphragm 1 to avoid rupturing the later. One means of doing this is shown in FIG. 7 from which it will be seen that a portion 3 of the supporting means 5 is externally screw-threaded to receive a clamping ring 12 which has an internally threaded portion 13. A relatively thick plate 14 of steel for example is clamped between the clamping ring 12 and a sealing ring 15, as of rubber for example, disposed on the portion 3 of the supporting means. The chamber formed between the plate 14 and diaphragm 1 is filled with liquid whereby deformations of the plate 14 caused by high pressure variations are transmitted to the diaphragm 1. This type of device is particularly suitable for measuring pressure variations of vibrations in the ground.

Figure 8:
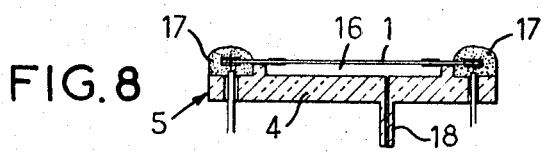
FIG. 8 shows the device of the invention in the form of a microphone.

As seen in FIG. 8, the device of the invention may be used as a microphone. In this arrangement there is used only the portion 4 of the support 5 in which is formed a shallow chamber 16 across which extends the diaphragm 1, which latter is glued to the portion 4 at 17. The chamber 16 communicates with the atmosphere through a tube 18, and any conventional damping system may be provided according to the dimensions of the device and the thickness and nature of the diaphragm used. Of course, several interconnected chambers may be provided behind the diaphragm 1 instead of the single one shown. It will be seen that this very simple microphone requires neither high voltage nor a magnetic circuit and can be made of extremely small dimensions and very light. The reduction of its dimensions are inevitably accompanied by a diminution of its sensitivity but by giving it a diameter of the order of 10 mm. its weight is a few grams and its sensitvty is still very good.

On dispensing with the tube or tubes 18 there is obtained another version of the device of the invention whose function is not limited to low frequencies and may conveniently be used for static or dynamic measuring for example as manometric capsule enabling quasi-punctual pressures to be measured in a fluid. For example, it is possible by means of this device to establish point by point a curve of pressures in a stream of liquid or gas for wind tunnel measurements for example.

In the embodiment described, the conducting layers are for example of bismuth and the connecting layers of nickel. However, the bismuth can be replaced by any other conductors or semi-conductors having similar properties, such as antimony, tellurium, germanium (doped or not) indium antimonide (doped or not) indium arsenide (doped or not) and silica. The nickel may be replaced by connecting layers of gold, silver, aluminium, copper, platinium, and especially chrome, etc.

As explained above, when extremely thin diaphragm in the nature of membrane are to be used, it is not possible to use a flat membrane for the reasons already explained and the membrane must comprise a peripheral annular part and an inner part, said parts meeting at an arris.

Figure 11:
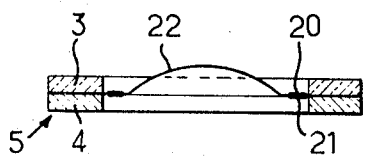
FIG. 11 shows a device of the invention incorporating a thin membrane having differently shaped inner and outer parts.

FIG. 11 shows in section one embodiment of this type of device in which there is provided as before a supporting means 5 having upper and lower portions 3 and 4 respectively between which the membrane is firmly gripped. In this embodiment, the membrane has a peripheral annular portion 20 on both sides of which are disposed the conducting layers 21, the central portion of the membrane having the shape of a dome 22. The membrane is connected to the support 5 and the electrical connections are made to the conducting layers in the manner previously described.

Figure 12:
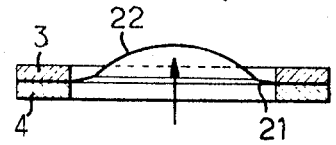
FIGS. 12 and 13 show respectively the effects obtained by deforming the device of FIG. 11 to one side and the other of its central position.
Figure 13:
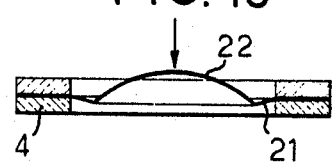

FIGS. 12 and 13 show in section the shapes taken by the membrane of FIG. 11 when pressure is applied respectively to the concave and convex faces of the latter. It will be seen that in both cases the pressure is transmitted by the domed portion 22 to the annular peripheral portion 21 on which the conducting layers are disposed.

Figure 14:
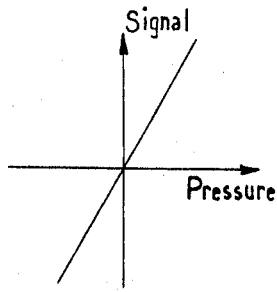
FIG. 14 is a curve showing the linear nature of the output of the device of the invention, as shown in FIGURE 11, having a thin membrane.

FIG. 14 is a curve showing the linearity of the output of the device of FIG. 11 when fed as previously described the output being shown as a function of the applied pressure difference.

Figure 15:
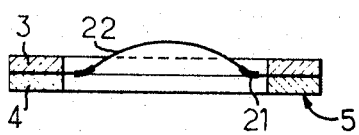
FIGS. 15 and 16 show different dispositions of the conducting layer on devices of the invention having thin membranes.

FIG. 15 shows a variation of the device of FIG. 11 in which the conductive layers are disposed over the arris at the junction of the two parts of the membrane.

Figure 16:
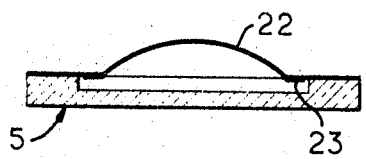
Figure 17:
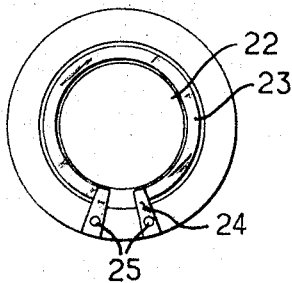
FIGS. 17 and 18 show two different forms of single conducting layer devices.
Figure 18:
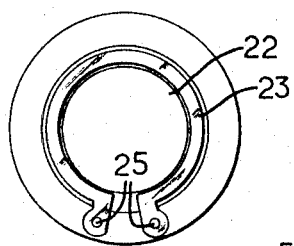

FIGS. 16 to 18 show by way of example devices using the shaped membrane just described. These devices can be the same as those already described except for the difference between the first named diaphragm and the shaped membrane.

However, the devices shown in FIGS. 16 to 18 are simplified in that they incorporate a single thin conducting layer 23 shown in section in FIG. 16 and in plan in FIG. 17. FIG. 17 also shows connecting layers 24 of nickel for example connecting the layers 23 to terminals 25 whereby the device may be connected into an external circuit. The single conducting layer 23 may be used as a quarter bridge or used in an appropriate electrical circuit which transforms the variation of resistance of the layer 23 into an electrical voltage.

This arrangement offers many advantages. In a microphone for example, the active layer is deposited on the inner side of the membrane so as to be isolated from any humid and corrosive atmosphere. The membrane, being particularly chemically inert, if it is of Mylar for example, having no active layers on its outer face, constitutes an excellent protection for the inner conducting layer. A microphone or dynamic pressure gauge thus formed will be insensitive to corrosive agents and there is no need to provide further protective coatings. However, it is possible to cover the outer face of the membrane partially or wholly by a deposit such as a thin layer of aluminium or nickel obtained by thermal evaporation, electrolysis or by any other suitable process thus providing a screen against electrostatic, magnetic and thermal phenomena.

Figure 19:
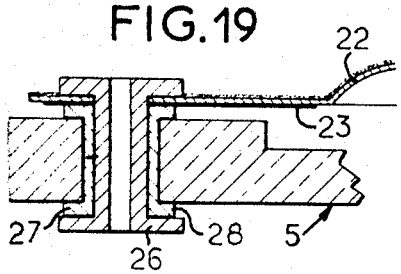
FIG. 19 is an enlarged view of one way of providing a connection to the conducting layer from an external circuit.

Moreover, in this arrangement the connecting layers can be much shorter and it is not therefore necessary to make them of low resistance metal. They may even be omitted altogether, in which case the conducting layer has the form indicated in FIG. 18. The connection of this layer to an external circuit is effected by inserting, as shown in FIG. 19, a metal eyelet 26 through the membrane, conducting layer and supporting means and clamping it so that these elements are secured firmly together. A soldered connection can then be made to the eyelets and thus to the conducting layer in contact therewith. A metal insert 27 of nickel for example can be inserted between the neck of the eyelets and the sides of the hole through which the latter pass, small flanges 28 on the insert being clamped between the heads of the eyelets and the supporting means. Alternatively, instead of this insert the inner walls and outer lips of the hole can be coated with a conductor so as to provide a good electrical connection between the conducting layer and exterior circuit.

The devices of FIGS. 17 and 18 may, of course, have similar conducting layers on both their surfaces so that they may be used in semi-bridge circuits.

Figure 20:
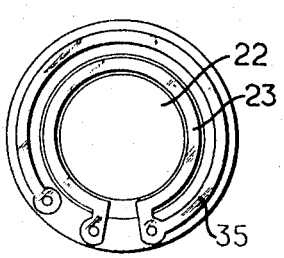
FIG. 20 shows another embodiment of the device having a thin membrane.

FIG. 20 shows a variation of the device above described having, as well as the aforesaid layer 23, an additional layer 35 disposed as shown in FIG. 20 on that part of the membrane which is glued or otherwise secured to the supporting means. This layer 35 is not subjected to deformations but connected in a half-bridge circuit with the active conducting layer 23 it produces a thermal compensating effect in the device. The layer 35 can also be disposed on any other convenient part of the device to achieve the same effect.

Figure 21:
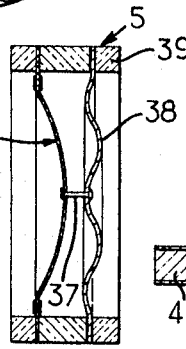
FIG. 21 shows an embodiment of the device having a thin membrane adapted to measure relatively high pressure.

FIG. 21 shows another device for measuring relatively high pressures comprising the shaped membrane shown generally at 36 connected mechanically, by means of a pin 37, to a corrugated diaphragm 38 firmly gripped between the supporting means 5 and annular gripping member 39. The liquid employed in the device of FIG. 7 is no longer required since the vibrations of the stronger diaphragm 38 are transmitted by means of the pin 37 to the more fragile member 36. The thickness, diameter and shape of the stronger membrane are chosen according to the range of pressures to be measured by the device. Moreover, it is easier to maintain the two faces of the membrane 36 at the same temperature, and this leads to a better thermal compensation.

Figure 22:
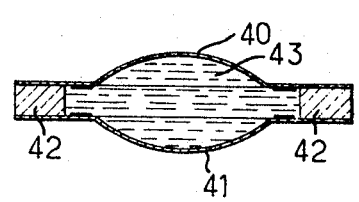
FIG. 22 shows a variation of the device of the invention including two thin membranes defining a liquid filled cavity.

FIG. 22 shows in section a device according to the invention having two substantially identical members such as that illustrated in FIG. 17 or 18 separated by a liquid. This device provides a precise thermal compensation and can be used as a static or low frequency pressure gauge. The two membranes as shown at 40 and 41 are glued or otherwise secured to support 42. The membranes carry, on their inner surface, conducting layers of the kind shown in FIG. 17 or 18 as nearly identical as possible. Eyelets, not shown in FIG. 22, but disposed as has been indicated enable connections to be made from the conducting layers to each other and to an external circuit. The layers are thus connected in a half-bridge circuit. A liquid 43, such as oil for example, inert to the conducting layers, is contained between the membranes, and it is important that all bubbles of air are removed from the liquid. This may be done by purging holes (not shown) in the supporting means.

It will be understood that if a difference of pressure is applied between the two outer surfaces of the membranes 40 and 41 of the device, the membranes will be deformed in opposite senses and the variations of resistance of the conducting layers will be in opposite senses. Since the layers are used in a half bridge circuit, these effects due to the pressure will reinforce each other.

By contrast, if the temperature varies, the expansion of the support, of the membranes and of the liquid produce deformations of the membranes, and thus resistance variations, in the same sense; since the layers are in a half-bridge circuit, these variations due to temperature fluctuations cancel each other.

The compensation of thermal effects is excellent and this is most important for a static low-frequency pressure gauge. The thin membrane device may be used in all the applications referred to herein of the diaphragm device. For example it may be used to measure the rate of flow of a fluid, or of the speed of displacement of a body in a fluid.

Figure 23:
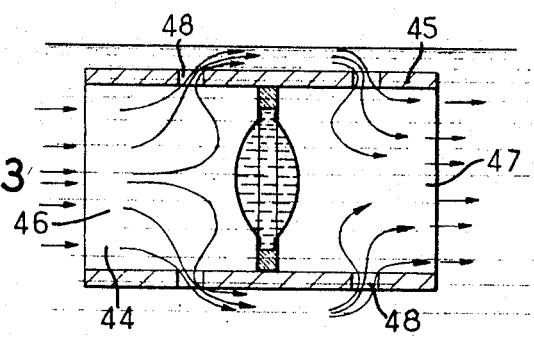
FIG. 23 is a diagrammatic view of the device of the invention for measuring the speed of displacement of a fluid with respect to the device.

FIG. 23 shows in a diagrammatic section a device of the invention immersed in a fluid 44 enabling the relative displacement of the device with respect to the fluid to be measured. The measuring device shown in FIG. 23 is the same as that shown in FIG. 22 described above, the device being placed in a tube 45. The relative displacement of the fluid with respect to the device will produce between the compartments 46 and 47 a difference of pressure as a function of the speed of displacement.

Such a device can be used to measure the rate of flow of a fluid, or the speed of displacement of a body, such as a boat for example floating in a liquid.

Flow orifices 48 can be provided in the tube 45, their size being variable so as to vary the sensitivity of the device. It will be observed that the device, which can be entirely symmetric, maintains the same sensitivity when the liquid flow is reversed, and that the voltage delivered reverses if the flow direction reverses. Thus, the device is capable, not only of measuring the absolute value of the rate of flow of a fluid, but of indicating the direction of the flow. The device can be of very small dimensions, and thus can be used to measure the rate of flow of very small portions of a fluid.

Any of the devices of the invention may have one or several compensating layers disposed in appropriate places on the diaphragm or membrane so that they are not subject to extension by the effects of pressure change. However, they will be subject to thermal effects in the same direction as for the active layers, and if they are placed in a semi-bridge or full bridge circuit with the active layers, a particularly good thermal compensation is obtained.

It is possible to use isotopes to obtain deposits and thus gauges which are insensitive to radioactivity. For example, by using the isotope of bismuth known as bismuth 210, one can obtain deposits of which the crystalline structure, and consequently the properties of extension, are the same as those for the natural isotope 209 since these properties only depend on the structure of the electronic layers. By contrast, isotope 210 is much less sensitive than isotope 209 to neutron bombardment, because isotope 210 is a neutronically saturated isotope which does not accept further particles such as neutrons for example which may impinge thereon during neutron bombardment.

Thin layers of these isotopes can easily be obtained by thermal evaporation in a vacuum of powdered isotopes or of ingots whereas known measuring devices using layers or wire gauges would require the same isotopes in the form of thin sheets or wires. The metallurgy of isotopes, and especially of alloy isotopes, being practically non-existent, and in any case difficult, one will understand the importance in this respect of thin layer devices.

In the cases where a thin membrane is used having an annular part and inner part, the latter may be dome shaped as shown in the various embodiments described with reference to FIGS. 11 to 13, although it may equally well have any other convenient shape, such as undulated for example, provided said inner part has sufficient rigidity to ensure that it will not be substantially deformed when transmitting the forces to which it is subjected to the peripheral portion.

Advantage may be taken of such indeformability of the inner part of membranes of the kind under consideration by placing thermal compensating layers on the said inner portion instead of on the part fixed to the supporting means as described above. This arrangement provides particularly precise thermal compensation, especially when the device is disposed across a chamber the pressure conditions of which are to be measured, since both the active and compensating layers may be exposed to the atmosphere within the chamber and thus both subject to the temperature changes of that atmosphere.

The device of the invention may also be arranged to act as an accelerometer for measuring accelerations by attaching to the deformable part of the diaphragm or membrane a mass whose acceleration is to be measured.

Such an accelerometer is particularly suitable for measuring very small accelerations and is merely one example of many embodiments of the device of the invention for measuring displacements.

What I claim is:

1. A pressure sensitive device for converting pressure variations into electrical varaitions, said device comprising a flexible diaphragm having thereon at least one thin conducting layer, diaphragm supporting means defining a circular portion of said diaphragm and firmly gripping said diaphragm around the periphery of said portion, and, within said supporting means, at least two means for connecting said layer into an external circuit, said conducting layer being disposed between said connecting means and extending along at least a part of the periphery of at least one face of said diaphragm portion, said device further comprising four conducting layers disposed two on either face of said diaphragm portion, each said layer extending in an arc through approximately 180°, said layers being interconnected to form a bridge circuit.

2. A device according to claim 1 wherein a single conducting layer extends around the major portion of the periphery of one face of said diaphragm portion.

3. A device according to claim 2 wherein said connecting means comprise terminals, said terminals being connected to said conducting layer by low resistance layers.

4. A device according to claim 1 comprising arcuate low resistance connecting layers two for each conducting layer, disposed on the same face of said diaphragm as their associated conducting layers and concentric with the latter, the conducting layers on one side of said diaphragm being symmetrically disposed with respect to a diameter of said diaphragm portion and on the other side being symmetrically disposed with respect to a diameter at right angles to said first diameter.

5. A device according to claim 1 wherein said supporting means defines a chamber around said diaphragm portion, inlet and outlet means being disposed respectively on either side of said portion permitting the admission of fluid to said chamber for pressure measurement.

6. A device according to claim 1 wherein said supporting means defines a chamber closed at one end by said diaphragm portion and having at its other end a tube whereby said chamber communicates with the ambient atmosphere.

7. A device according to claim 1 wherein said supporting means is secured around the inner periphery of a tube to form two compartments, whereby the device measures the difference in pressure between said compartments.

8. A device according to claim 3, wherein said low resistance layers are of a material selected from the group consisting of nickel, chrome, gold, silver, copper and platinum.

9. A device according to claim 1, wherein said conducting layer is made from a material selected from the group consisting of bismuth, antimony, tellurium, indium, germanium, silicon and their alloys.

10. A pressure sensitive device for converting pressure variations into electrical variations, said device compriisiing a flexible membrane having a circular portion composed of an inner part and a peripheral annular part, said parts meeting in an arris, at least one thin conducting layer disposed on said annular part of said membrane, membrane supporting means delimiting said circular portion of said membrane and firmly gripping said membrane around the periphery of said circular portion, and, within said supporting means, at least two means for connecting said layer into an external circuit, said conducting layer being disposed between said connecting means and extending along at least a part of the periphery of at least one face of said circular portion.

11. An arrangement as defined in claim 10 wherein said inner part is dome-shaped.

12. A pressure sensitive device for converting pressure variations into electrical variations, said device comprising a flexible membrane having a circular portion composed of an inner part and a peripheral annular part, the junction of said parts forming an arris, at least one thin conducting layer disposed on said circular portion and extending across said arris, membrane supporting means delimiting said circular portion of said membrane and firmly gripping said membrane around the periphery of said circular portion, and, within said supporting means, at least two means for connecting said layer into an external circuit, said conducting layer being disposed between said connecting means and extending along at least a part of the periphery of at least one face of said circular portion.

13. An arrangement as defined in claim 12 wherein said inner part is dome-shaped.

14. A pressure sensitive device for converting pressure variations into electrical variations, said device comprising a first flexible diaphragm having thereon at least one thin conducting layer, diaphragm supporting means defining a circular portion of said diaphragm and firmly gripping said diaphragm around the periphery of said portion, at least two means within said supporting means for connecting said layer into an external circuit, said conducting layer being disposed between said connecting means and extending along at least a part of the periphery of at least one face of said circular portion, a second diaphragm, clamping and sealing means for holding and sealing said second diaphragm on said supporting means in spaced relation with respect to first diaphragm, and coupling means between said two diaphragms for causing deformations experienced by said second diaphragm to be applied to said first diaphragm.

15. A device according to claim 14 wherein said coupling means comprises a liquid mass confined between said two diaphragms.

16. A device according to claim 14 wherein said coupling means comprises a mechanical link.

17. A pressure sensitive device for converting pressure variations into electrical variations, said device comprising two identical flexible diaphragms each having thereon at least one thin conducting layer, diaphragm supporting means delimiting a circular portion of each said diaphragm and firmly gripping each said diaphragm around the periphery of its said circular portion so as to maintain said two diaphragms in oppositely disposed relationship and to define, together with said diaphragms, a sealed chamber filled with liquid, and, within said supporting means, at least two means for connecting said layer on each said diaphragm into an external circuit, each said conducting layer being disposed between the connecting means associated with its respective diaphragm and extending along at least a part of the periphery of at least one face of said circular portion of its respective diaphragm.

18. A pressure sensitive device for converting pressure variations into electrical variations, said device comprising a flexible diaphragm, diaphragm supporting means delimiting a circular portion of said diaphragm and firmly gripping said diaphragm around the periphery of said circular portion, at least two external circuit connecting means within said supporting means, at least one thin conducting layer disposed between said connecting means and extending along at least a part of the periphery of one face of said circular portion, and a screening layer of a metallic material deposited by thermal vaporization on the other face of said diaphragm.

19. A pressure sensitive device for converting pressure variations into electrical variations, said device comprising a flexible diaphragm having thereon at least one thin conducting layer, diaphragm supporting means delimiting a circular portion of said diaphragm and firmly gripping said diaphragm around the periphery of said circular portion, at least two means within said supporting means for connecting said layer into an external circuit, said conducting layer being disposed between said connecting means and extending along at least a part of the periphery of at least one face of said diaphragm portion, and at least one additional conducting layer disposed on a part of the device not subject to deformations and connected in a bridge circuit with said at least one thin conducting layer to provide thermal compensation.

20. A device as defined in claim 19 wherein said additional conducting layer is disposed on a different part of said diaphragm from that carrying said thin conducting layer.

21. A pressure sensitive device for converting pressure variations into electrical variations, said device comprising a flexible diaphragm having thereon at least one thin conducting layer, diaphragm supporting means defining a circular portion of said diaphragm and firmly gripping said diaphragm around the periphery of said portion, and, within said supporting means, at least two means for connecting said layer into an external circuit, said conducting layer being disposed between said connecting means and extending along at least a part of the periphery of at least one face of said circular portion, said conducting layer being made from the neutronically saturated isotope of the material selected from the group consisting of bismuth, antimony, tellurium, indium, germanium, silicon and their alloys.

References Cited

UNITED STATES PATENTS

| | | | |
|---|---|---|---|
| Re. 25,924 | 12/1965 | Stedman | 338—2 |
| 2,344,642 | 3/1944 | Ruge. | |
| 2,807,167 | 9/1957 | Statham. | |
| 2,400,467 | 5/1946 | Ruge | 338—4 |
| 2,580,407 | 1/1952 | Clark | 338—4 |
| 2,507,501 | 5/1950 | Clark | 338—4 |
| 3,035,240 | 5/1962 | Starr | 338—42 |
| 3,269,184 | 8/1966 | O'Connor | 338—4 |

REUBEN EPSTEIN, Primary Examiner

U.S. Cl. X.R.

73—88.5; 338—2, 3, 4, 42